(12) United States Patent
Liao

(10) Patent No.: US 7,895,735 B2
(45) Date of Patent: Mar. 1, 2011

(54) ELEMENT MOUNTING APPARATUS

(75) Inventor: Chia-Hung Liao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 271 days.

(21) Appl. No.: 12/342,226

(22) Filed: Dec. 23, 2008

(65) Prior Publication Data

US 2009/0313815 A1 Dec. 24, 2009

(30) Foreign Application Priority Data

Jun. 24, 2008 (CN) .................. 2008 1 0302282

(51) Int. Cl.
*B23P 19/00* (2006.01)
(52) U.S. Cl. .............. 29/739; 29/729; 29/732; 29/737; 156/542
(58) Field of Classification Search .......... 29/729, 29/739, 740–743, 705, 719, 722, 601.2; 156/556, 156/571, 542, 442
See application file for complete search history.

(56) References Cited

U.S. PATENT DOCUMENTS

| | | | |
|---|---|---|---|
| 5,659,566 A * | 8/1997 | Takemoto ............. | 372/50.23 |
| 5,733,410 A * | 3/1998 | Gore et al. ............ | 156/556 |
| 6,435,808 B1 * | 8/2002 | Araya et al. ........... | 414/783 |
| 7,721,420 B2 * | 5/2010 | O'Farrell et al. ....... | 29/729 |
| 2009/0260568 A1 * | 10/2009 | Chuang ................. | 118/666 |
| 2009/0277383 A1 * | 11/2009 | Chuang ................. | 118/667 |
| 2009/0313815 A1 * | 12/2009 | Liao ..................... | 29/732 |

* cited by examiner

*Primary Examiner*—Minh Trinh
(74) *Attorney, Agent, or Firm*—Clifford O. Chi

(57) ABSTRACT

An element mounting apparatus includes a movable arm, an electromagnet, a first controller and a glue dispenser. The glue dispenser includes a plate body and a second controller. The plate body includes an inner space containing glue, a through hole defined therein, and a plurality of spaced glue outlets formed in the first surface and communicating with the inner space. The second end of the electromagnet engages the through hole to attract the magnetic element on the first surface of the plate body with the glue outlets surrounding, and repelling the magnetic element to the retainer. The second controller ejects glue out of the inner space of the plate body via the glue outlets, thereby adhesively mounting the magnetic element to the retainer.

8 Claims, 3 Drawing Sheets

ELEMENT MOUNTING APPARATUS

CROSS-REFERENCE TO RELATED APPLICATIONS

This application is related to a commonly-assigned co-pending application entitled, "RESILIENT PLATE AND LENS ACTUATOR WITH SAME", filed on Aug. 15, 2008 (U.S. application Ser. No. 12/192,376). Disclosures of the above identified application are incorporated herein by reference.

BACKGROUND

1. Technical Field

The present disclosure relates to an element mounting apparatus.

2. Description of Related Art

Voice coil motors (VCM) are widely used as lens actuators in cameras. As shown in FIG. 3, a typical VCM 60 includes a cubic retainer 61, four permanent magnetic elements 62 adhesively mounted on four sides thereof, a bottom plate 63 and a top plate 64 respectively mounted on a bottom and a top of the retainer 61, and a lens barrel 90 wrapped with wire coils received in the inner space of the retainer 61. When an alternating current is applied to the wire coils, the lens barrel 90, according to the wire coils, is actuated to move up and down by action of a magnetic field between the magnetic elements 62 and the wire coils.

However, the magnetic elements 62 may magnetically conflict with each other, presenting difficulty in their mounting on the sides of the retainer 61. Efficiency of adhesive mounting of the magnetic elements 62 to the retainer 61 is thus deteriorated.

What is needed, therefore, is an element mounting apparatus, which can overcome the limitations described.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE EMBODIMENTS

Embodiments of the present apparatus will now be described in detail below and with reference to the drawings.

Figure 1:
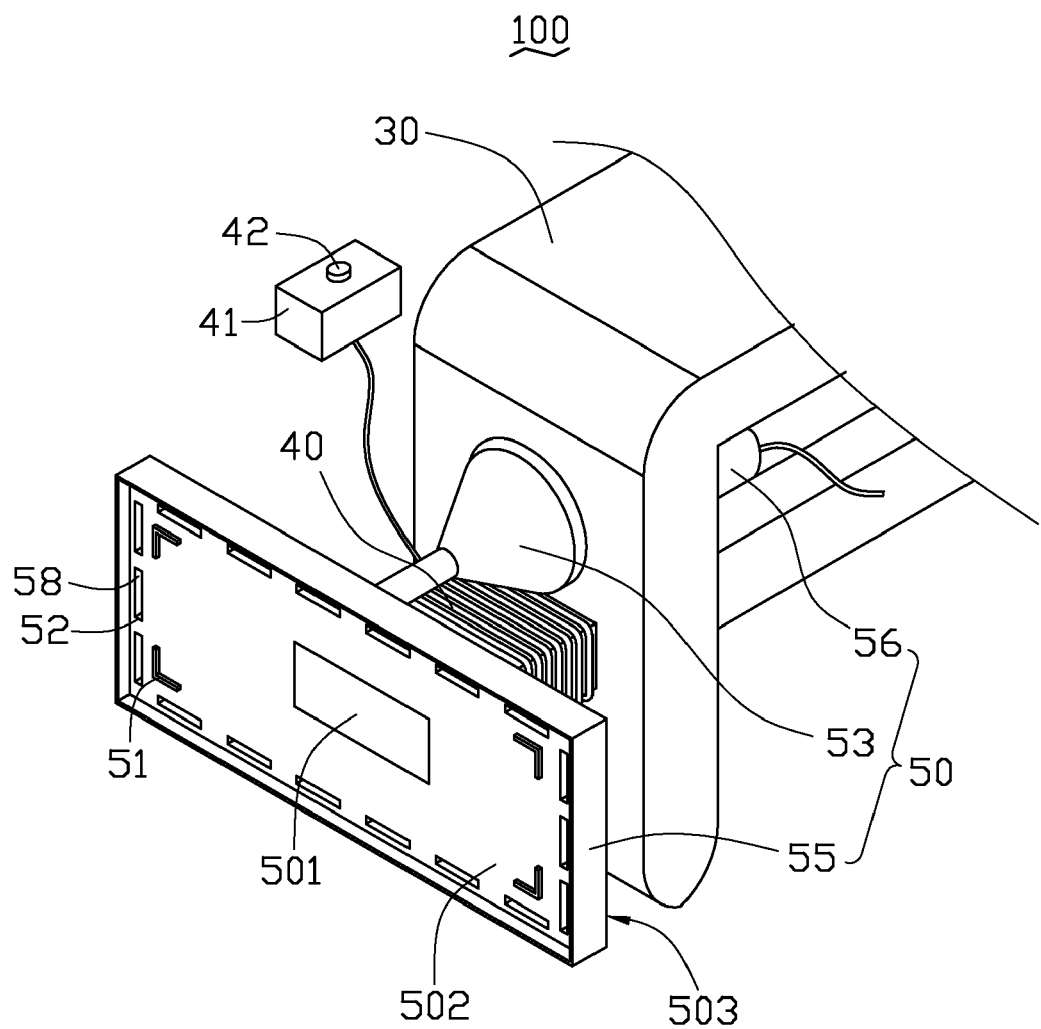
FIG. 1 is a partial cut-away view of an apparatus in accordance with an exemplary embodiment.
Figure 2:
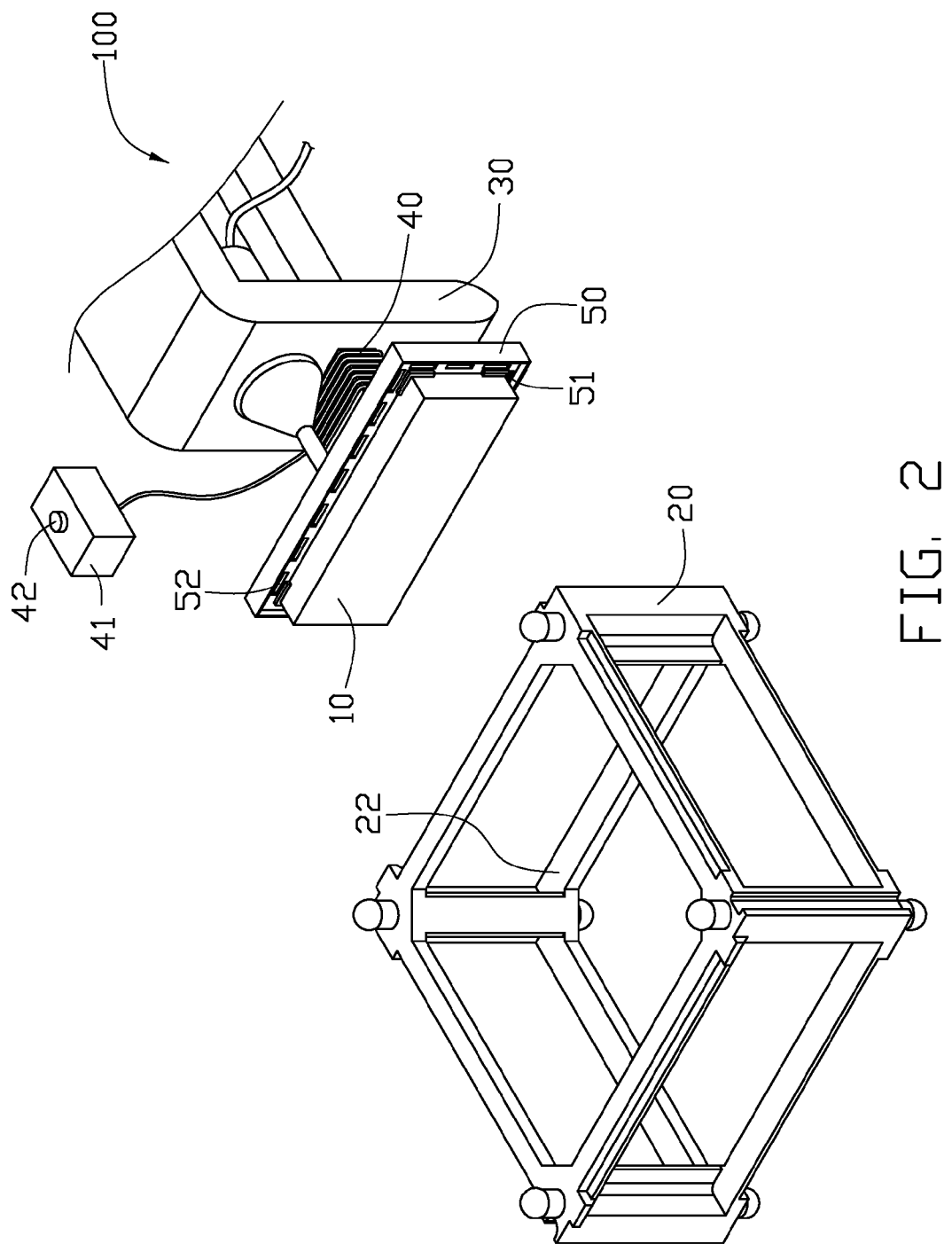
FIG. 2 is a schematic view showing the apparatus of FIG. 1 attracting a magnetic element, and a retainer receiving the magnetic element.
Figure 3:
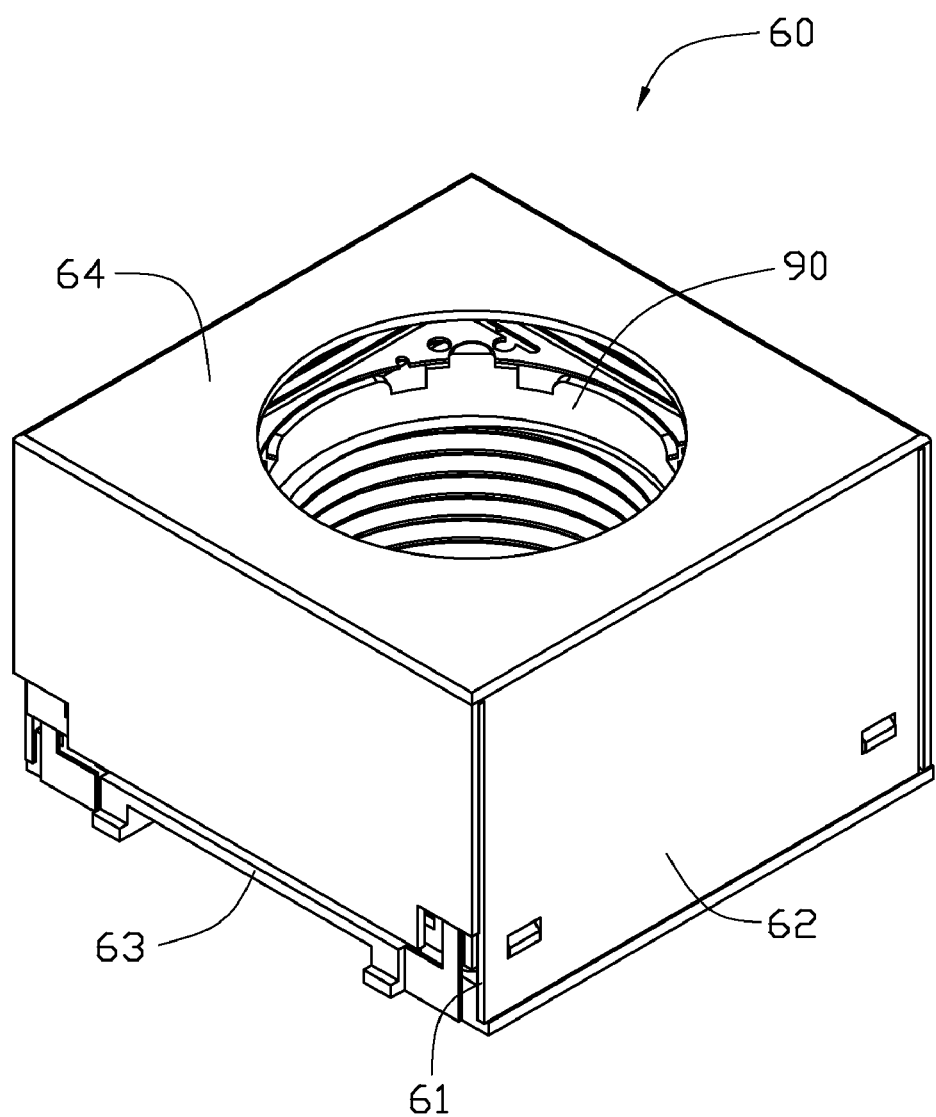
FIG. 3 is a schematic view of a voice coil motor including a retainer having four magnetic elements adhesively mounted on four sides thereof.

Referring to FIGS. 1 and 2, an exemplary element mounting apparatus 100, a magnetic element 10, and retainer 20, are provided. The apparatus 100 includes a movable arm 30, an electromagnet 40, a first controller 41 and a glue dispenser 50.

The magnetic element 10 is a permanent magnet, and is rectangular. The retainer 20 is hollow and cubic and has four side frames 22 on which four magnetic elements 10 are adhesively mounted.

The movable arm 30 may be a mechanical arm, and is capable of motion in X, Y, and Z directions. The electromagnet 40 includes an iron core having first and second ends, and wire coils wrapped around the iron core from the second end to the first end. The first end is attached on the movable arm 30. The first controller 41 applies an alternating current to the wire coils, thereby controlling a magnetic polarity of the electromagnet 40 to oppose that of the magnetic element 10 at a first time and to match that of the magnetic element 10 at a second time. The first controller 41 has a switch 42 thereon controlling change in direction of the alternating current.

The glue dispenser 50 includes a plate body 55, a second controller 56 and a pipe 53. The plate body 55 is rectangular, and has an inner space 58 containing glue. A through hole 501 is defined between a first surface 502 and a second surface 503 on opposite sides of the plate body 55. A plurality of spaced glue outlets 52 are formed in the first surface 502, communicating with the inner space 58. Four protrusions 51 are formed on the first surface 502. The through hole 501 is in a center of the plate body 55. The glue outlets 52 surround the through hole 501, and are arranged in a periphery of the first surface 501. Each of the protrusions 51 has a horizontal part and a vertical part. The protrusions 51 are arranged between the through hole 501 and the glue outlets 52, with each thereof adjacent to a corner of the plate body 55.

The second controller 56 may be an air pump, and is integrated in the movable arm 30. The pipe 53 is applied between the movable arm 30 and the plate body 55. The pipe 53 includes a large part interconnected with the second controller 56, and a small part interconnected with the inner space 58 of the plate body 55.

The plate body 55 is supported by the electromagnet 40, with the second end of the electromagnet 40 engaging the through hole 501. The second end of the electromagnet 40 attracts the magnetic element 10 on the first surface 502 of the plate body 55 when polarity of the electromagnet 40 opposes that of the magnetic element 10, and repelling the magnetic element 10 to the retainer 20 when polarity of the electromagnet 40 matches that of the magnetic element 10.

An area surrounded by the four protrusions 51 is substantially the same as that of the magnetic element 10, such that the protrusions 51 help orient the magnetic element 10 on the first surface 502 of the plate body 55 when the magnetic element 10 is attracted by the electromagnet 40.

The magnetic element 10 is moved to the side frame 22 of the retainer 20 by the movable arm 30. The electromagnet 40 then repels the magnetic element 10 to lead the magnetic element 10 to engage the side frame 22. At the same time, the second controller 56 supplies air to the inner space 58 of the plate body 55, introducing glue into the inner space 58 via the glue outlets 52 to the side frame 22, adhering magnetic element 10 thereto.

By means of the movable arm 30, the electromagnet 40, and the glue dispenser 50, the magnetic element 10 is easily adhesively mounted to the retainer 20. A second magnetic element 10 can be easily mounted to a right position of the retainer 20 with equal ease, since the repelling force of the electromagnet 40 is applied on the second magnetic element 10 with simultaneous glue dispensation. Efficiency is thus enhanced.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An apparatus for mounting a magnetic element to a retainer, comprising:
- a movable arm;
- an electromagnet comprising a first end attached on the movable arm, and a second end;
- a first controller for controlling magnetic polarity of the electromagnet to oppose that of the magnetic element at a first time and to match that of the magnetic element at a second time;
- a glue dispenser comprising a plate body and a second controller, the plate body comprising an inner space containing glue, a through hole defined between a first surface and a second surface on opposite sides thereof, and a plurality of spaced glue outlets in the first surface and communicating with the inner space, the second end of the electromagnet engaging the through hole to attract the magnetic element on the first surface of the plate body with the glue outlets surrounding, and repelling the magnetic element to the retainer, the second controller configured for ejecting the glue out of the inner space of the plate body via the glue outlets, thereby adhesively mounting the magnetic element to the retainer.

2. The apparatus as described in claim 1, wherein the retainer is hollow and cubic and comprising four side frames on which four of the magnetic elements are adhesively mounted.

3. The apparatus as described in claim 2, wherein the plate body and the magnetic element are rectangular.

4. The apparatus as described in claim 3, wherein four protrusions are formed on the first surface of the glue dispenser for orienting the magnetic element therein, with the glue outlets surrounding the protrusions.

5. The apparatus as described in claim 1, wherein the second controller is an air pump.

6. The apparatus as described in claim 5, wherein the second controller is integrated in the movable arm, and a pipe is applied between the movable arm and the plate body, interconnecting the second controller and the inner space of the plate body.

7. The apparatus as described in claim 1, wherein electromagnet comprises a wire coil-wrapped iron core, wherein the first controller applies alternating current to the wire coils.

8. The apparatus as described in claim 1, wherein the magnetic element is a permanent magnetic element.

* * * * *